United States Patent [19]

Fanberg

[11] 4,006,602
[45] Feb. 8, 1977

[54] REFRIGERATION APPARATUS AND METHOD

[76] Inventor: Ralph Z. Fanberg, 6908 Airway Ave., Yucca Valley, Calif. 92284

[22] Filed: Jan. 6, 1975

[21] Appl. No.: 538,898

Related U.S. Application Data

[63] Continuation-in-part of Ser. No. 494,538, Aug. 5, 1974, abandoned, which is a continuation of Ser. No. 329,548, Feb. 5, 1973, abandoned.

[52] U.S. Cl. .................................. 62/113; 62/117; 62/197; 62/505; 62/513; 415/178; 417/367
[51] Int. Cl.[2] ......................................... F25B 41/04
[58] Field of Search ............ 62/196, 197, 199, 113, 62/117, 505, 513; 415/178; 417/366, 367

[56] References Cited

UNITED STATES PATENTS

| 3,106,334 | 10/1963 | Fobleman et al. .............. | 62/505 X |
| 3,163,999 | 1/1965 | Ditzler et al. .................. | 62/505 |
| 3,165,905 | 1/1965 | Ware .............................. | 62/505 |
| 3,300,997 | 1/1967 | Kocher .......................... | 62/505 X |
| 3,379,033 | 4/1968 | Grant ............................. | 62/505 |
| 3,407,623 | 10/1968 | Richardson et al. ............ | 62/505 |

FOREIGN PATENTS OR APPLICATIONS

| 1,012,991 | 12/1965 | United Kingdom .............. | 62/505 |
| 1,048,562 | 11/1966 | United Kingdom .............. | 62/505 |
| 1,194,006 | 6/1970 | United Kingdom .............. | 62/505 |
| 1,242,828 | 8/1971 | United Kingdom .............. | 62/505 |

*Primary Examiner*—William F. O'Dea
*Assistant Examiner*—Ronald C. Capossela
*Attorney, Agent, or Firm*—Richard L. Gausewitz

[57] ABSTRACT

The invention makes use of refrigerant passages or conduits in very effective heat-exchange relationship with the compression chamber and other hot parts of the compressor in a refrigeration system. The passages communicate at their inlet with an expansion valve or orifice, and at their outlet with a region of the compression chamber such that introduction of refrigerant vapor from the passages does not adversely affect the suction of the compressor. The expansion valve receives liquid refrigerant directly from the condenser of the system. The refrigerant vaporizes while passing through the passages, and then is injected in vapor form into the compression chamber for compression along with the main body of refrigerant vapor received from the evaporator of the system. Heat from the compressor, particularly the compression chamber and (in a piston-type compressor) the valve plate, is transferred through the walls of the passages to the vaporizing liquid-cooled refrigerant passing through the passages.

In accordance with one major aspect of the present invention, vaporizing refrigerant liquid is employed directly and effectively to cool the compressor, without the necessity of providing any oil cooler. The need for an oil cooler is eliminated since the present invention maintains the compressor sufficiently cool that the oil does not become excessively hot.

In accordance with another major aspect of the invention, the vaporizing refrigerant is forced through passage or conduit means to the hottest compressor portions, where cooling is most critically needed, in effective heat-transfer relationship with such portions.

Flow of refrigerant through the passages is automatically regulated to maintain the compressor generally within a preselected operating temperature range, by temperature and pressure-controlled flow regulating valves.

32 Claims, 11 Drawing Figures

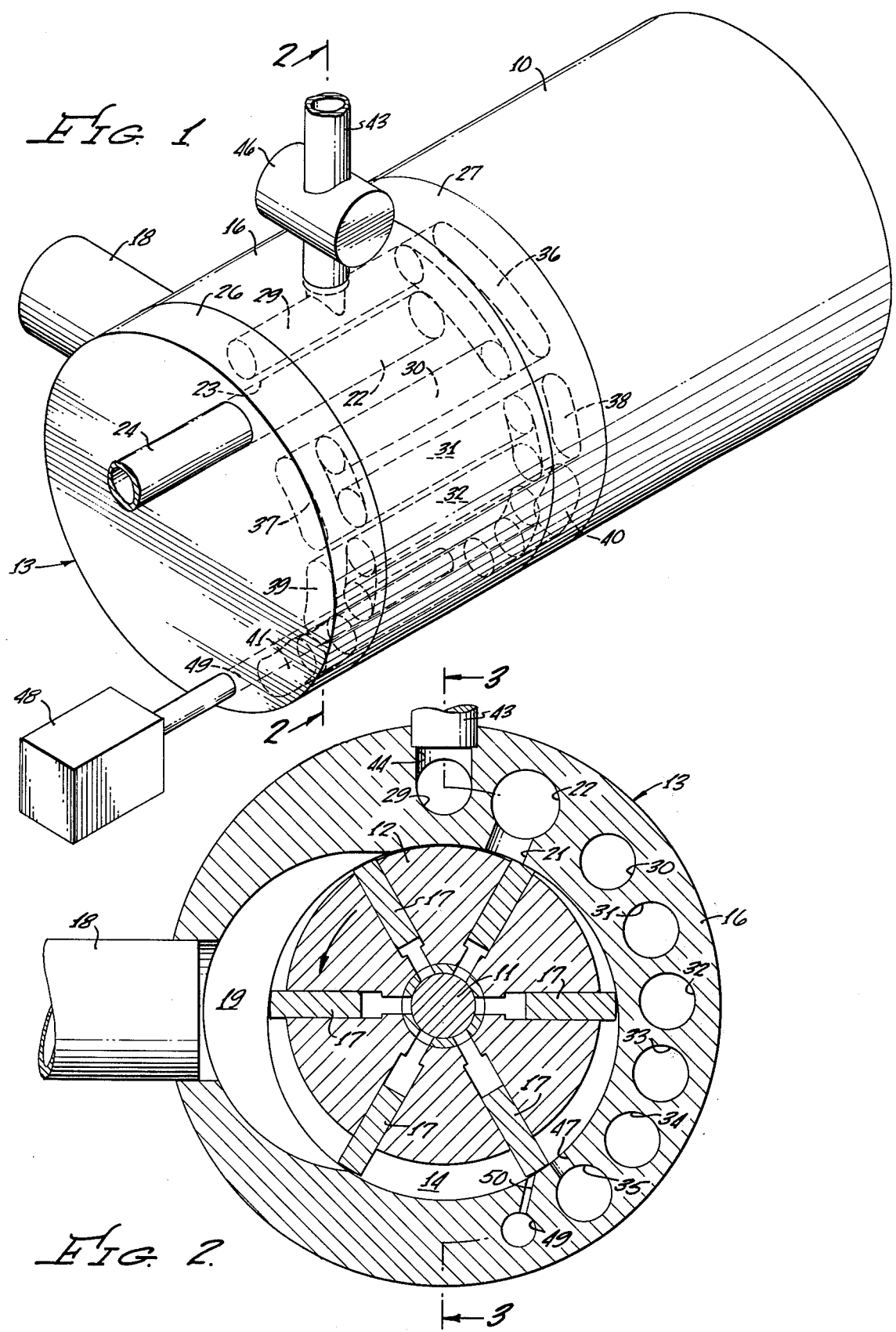

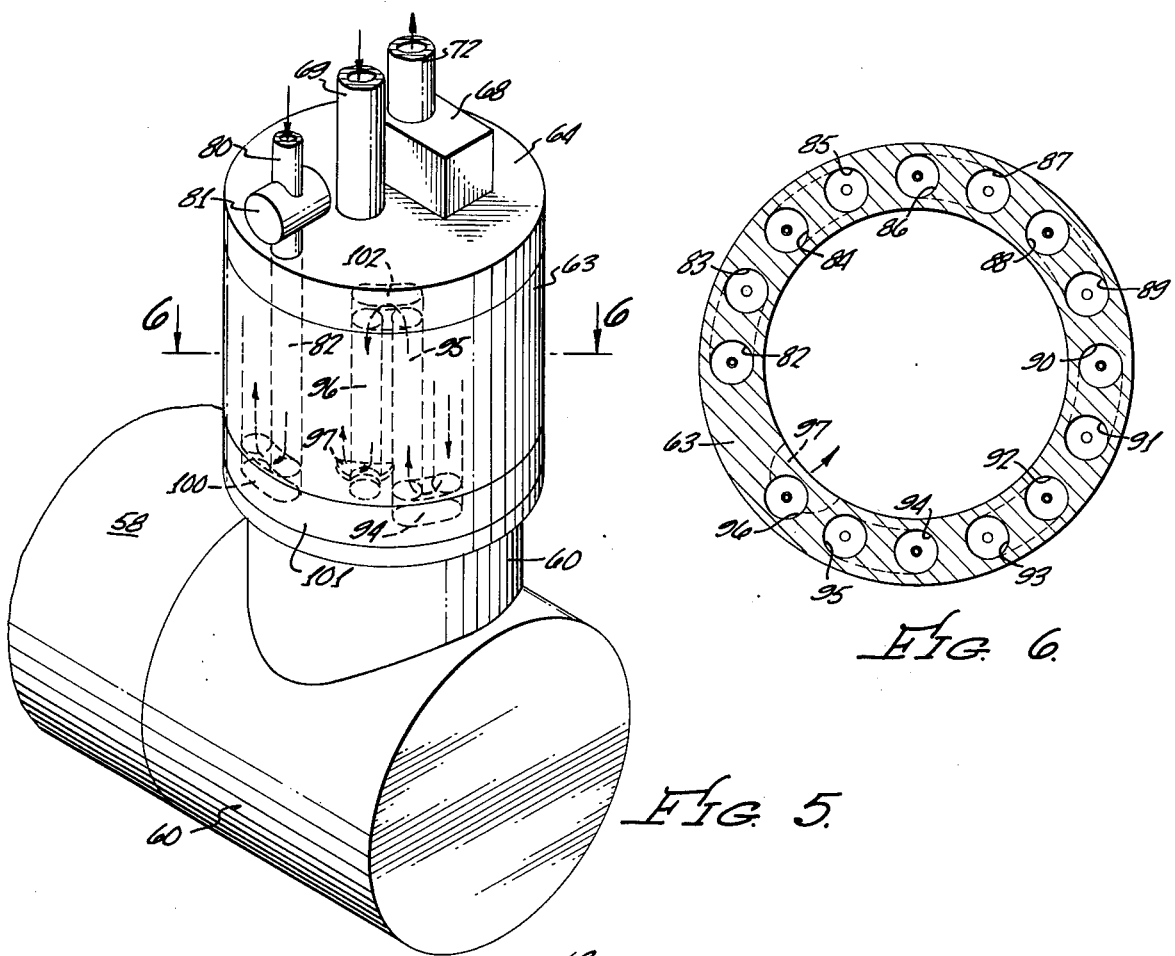
Fig. 5.
Fig. 6.
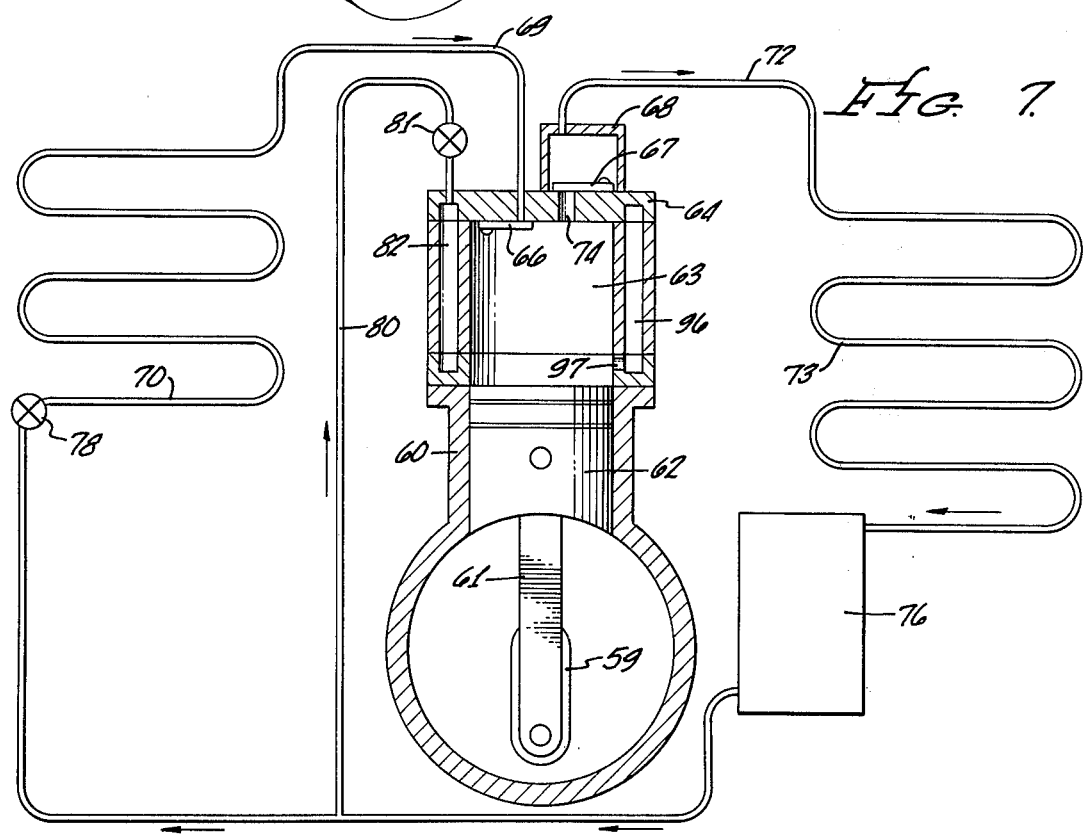
Fig. 7.

REFRIGERATION APPARATUS AND METHOD

CROSS REFERENCE TO RELATED APPLICATIONS

This application is a continuation-in-part of my copending application Ser. No. 494,538, filed Aug. 5, 1974, for Refrigeration Apparatus and Method now abandoned. Application Ser. No. 494,538 is, in turn, a continuation of application Ser. No. 329,548, filed Feb. 5, 1973, for Refrigeration Apparatus and Method, now abandoned.

BACKGROUND OF THE INVENTION

1. Field of the Invention

This invention relates to the field of mechanical refrigeration systems and methods wherein the refrigerant is alternately vaporized and condensed. The mechanical compressor employed in the system may be rotary, rotary vane, piston, etc.

2. Description of Prior Art

There is a major need, for example in automobile air conditioners, the air conditioners of small aircraft, etc., for a refrigeration system which can be extremely small and light in weight, and is efficient and capable of operating well in a hot environment (for example, under the hood of an automobile). To achieve large amounts of cooling with a small and light refrigeration system, it is necessary that the compressor be driven at a very high speed. Resulting frictional effects, in addition to the heat generated by compressing the refrigerant vapor, create a great deal of heating — with consequent problems relating to lubrication, carbon formation, etc. Heating is also exacerbated by the hot environment in which the system may operate.

Heating of the compressor causes (1) lowering of the volume of vapor which the compressor will handle at a given speed, (2) an excessively high superheat in the vapor, (3) a lowering of efficiency, and (4) the problems relative to lubrication and carbon formation. It follows that cooling of the compressor is critically important, but it must be done effectively, economically and in such a way as not to affect adversely the operation or size of the compressor or of other portions of the system. It is highly important that effective cooling occur in regions where heating is the worst. It is also highly important that effective cooling occur in the absence of expensive oil cooling means, since such means add greatly to the bulk and expense of the system.

There are large numbers of patents directed to the problem of cooling the compressor in a mechanical refrigeration system, or to associated problems. These include: U.S. Pat. Nos. 1,893,171; 2,178,425; 2,306,632; 2,470,655; 2,510,887; 3,105,633; 3,109,297; 3,111,820; 3,210,958; 3,250,460; 3,291,385; 3,379,033; 3,402,571; and 3,423,013. Most of the listed patents relate to the direct injection of liquid refrigerant into the compression chamber, in order that the liquid will expand in such chamber and therefore create a cooling action. However, the cooling action is not as continuous or effective as is that of the present invention. Furthermore, certain common refrigerants create, when in liquid form, an adverse effect relative to the lubricant present in the compression chamber.

U.S. Pat. No. 2,510,887 relates to a compressor in which there is no injection of liquid refrigerant into the compression chamber, the liquid refrigerant instead flowing around the compressor wall in heat-exchange relationship to the compression chamber and the head. Relative to the system of such U.S. Pat. No. 2,510,887, there is believed to be no substantial amount of vaporization of liquid in the heat-exchange circuit, nor is there effective heat transfer with certain of the hottest parts of the compressor, which means that the degree of cooling of the compressor is low. Furthermore, the refrigerant is educted into the compressor outlet, at elevated temperature, which tends to produce an adverse effect upon the system.

Another patent, U.S. Pat. No. 3,379,033, is such as to make workers skilled in the art believe that an oil-cooling means is required. Vaporizing refrigerant is employed to cool the oil in an oil-cooling circuit, at a location outside the compressor. A mixture of vaporous and liquid refrigerant is discharged from the external oil cooler and then further vaporized in an open annular chamber surrounding the cylinder wall. However, the characteristics of the open annular chamber are such that there is insufficient heat transfer with the hottest compressor regions. Thus, the U.S. Pat. No. 3,379,033 not only teaches a complex, large-size cooling means but one wherein compressor cooling is relative inefficient and ineffective. Additionally, the refrigerant is passed from such open chamber directly into the compressor suction line, thereby decreasing compressor efficiency under load condition.

Both of the U.S. Pat. Nos. 2,510,887 and 3,379,033 teach means for automatically regulating the amount of cooling action. Such means are, however, deficient in that (a) they are not quickly responsive to compressor temperature and/or (b) they do not use pressure of the cooling refrigerant as a means to control compressor temperature.

SUMMARY OF THE INVENTION

In accordance with the present method, liquid refrigerant in a mechanical refrigeration system is caused to vaporize substantially completely while it is constrained to flow through passage or conduit means along a predetermined cooling path in highly effective heat-exchange relationship with the compression chamber of the compressor, and/or highly effective heat-exchange relationship with other hot parts of the compressor (for example, the valve plate of a piston-type compressor). The latent heat of vaporization is therefore employed to create a continuous cooling action which maintains the compressor relatively cool even if it is operating at a very high rate of speed, and even if it is operating in a hot environment. There is no need for a separate oil cooler, with its attendant bulk and increased cost.

After the refrigerant thus vaporizes, it is injected into the compression chamber in such manner that compressor suction is not adversely affected. Thus, for example, in rotary vane compressors the method comprises injecting the refrigerant vapor at a location spaced one or more vanes from the suction port. As another example, in piston-type compressors the method comprises injecting the refrigerant vapor at a location near the upper surface of the piston when it is at the bottom of its stroke.

The apparatus comprises a refrigeration system incorporating a mechanical compressor, a condenser, an expansion valve, an evaporator, cooling passage or conduit means in highly effective heat-exchange relationship with the compression chamber and/or other hot regions of the compressor, means to introduce refrigerant — while in substantially one hundred percent liquid condition — into the cooling passage or conduit means, means to effect vaporization of the liquid refrigerant as it flows through the cooling passage or conduit means, and means to pass the resulting vapor from the cooling passage means into the compression chamber for compression therein. As stated above relative to the method, the last-named means is so located that the compressor suction will not be materially reduced.

Both the method and apparatus comtemplate forcing the vaporizing refrigerant to flow adjacent, and in excellent heat-exchange relationship with, compressor portions where cooling is most badly needed. It is critically important that such compressor portions be in good heat-transfer relationship with vaporizing refrigerant — not merely with refrigerant liquid only or refrigerant vapor only.

A thermally-controlled flow valve, and a pressure-controlled valve, are provided in series with the cooling passage or conduit means, whereby the compressor may be maintained generally within a predetermined temperature range regardless of the load demand and the ambient temperature. The thermally-controlled flow valve is directly responsive to compressor temperature. The pressure-controlled flow valve is so constructed as to automatically control compressor temperature in response to coolant pressure.

BRIEF DESCRIPTION OF THE DRAWINGS

FIG. 1 is an isometric view schematically showing a first embodiment of the compressor incorporated in the refrigeration apparatus of the present invention;

FIG. 2 is an enlarged transverse sectional view taken on line 2—2 of FIG. 1;

FIG. 5 is an isometric view illustrating schematically the compressor of a second embodiment of the invention, some of the internal passages being unshown;

FIG. 6 is a horizontal sectional view on line 6—6 of FIG. 5;

FIG. 7 is a schematic diagram of the refrigeration system incorporating the compressor of FIG. 5;

FIG. 10 is an exploded isometric view showing cylinder head portions of the compressor of FIG. 8.

DESCRIPTION OF THE PREFERRED EMBODIMENTS

Figure 3:
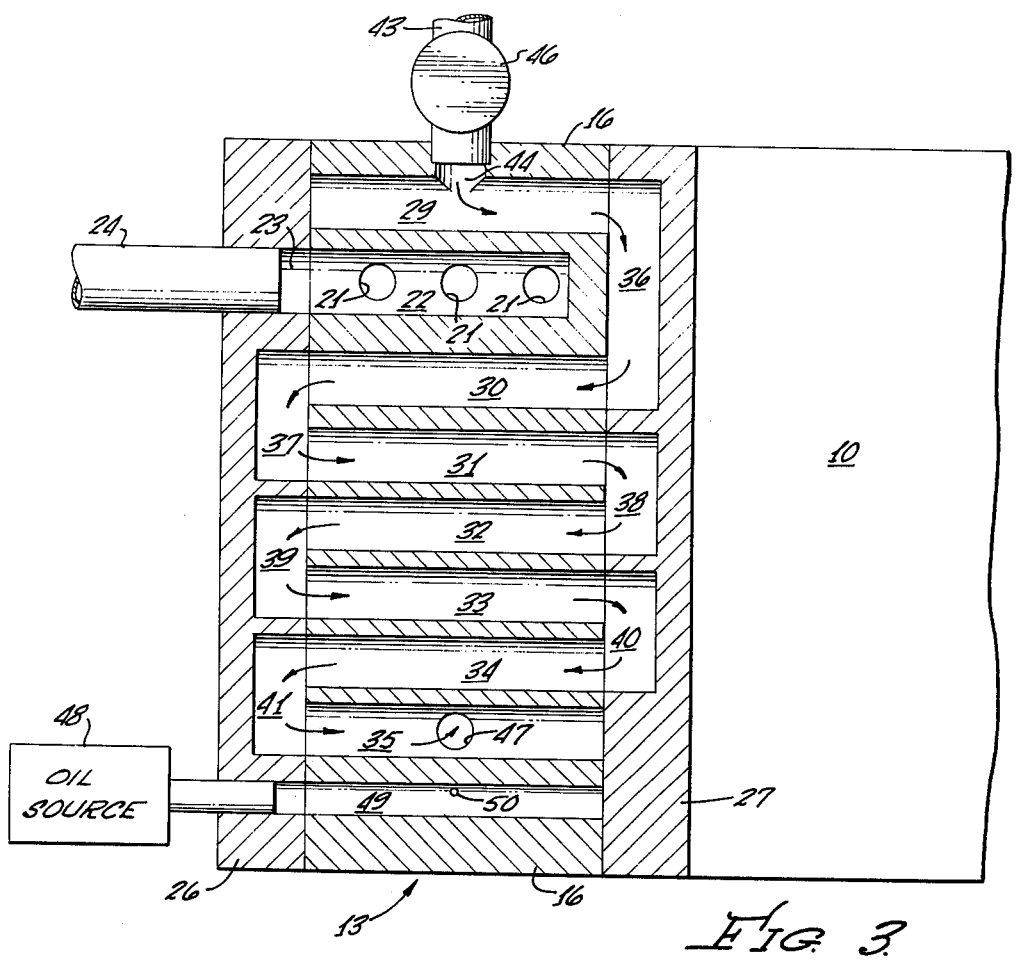
FIG. 3 is a sectional view taken on the curved line 3—3 of FIG. 2, showing the tortuous path for the vaporizing refrigerant.

Referring first to FIG. 1, an electric motor is schematically represented at 10, although it is to be understood that other forms of prime movers (for example, drive belts from internal combustion engines) may be employed if desired. The rotor (not shown) of motor 10 drives the shaft 11 (FIG. 2) of the cylindrical rotor 12 of a rotary vane compressor which is schematically represented at 13.

Rotor 12 rotates in a cylindrical chamber 14 which is formed within the central portion 16 of the stationary body of compressor 13. The chamber 14, and particularly the portion thereof which is exterior to the rotor 12, may be termed the "compression chamber" of compressor 13.

In the usual manner, the rotor 12 has a plurality of radially-slidable vanes 17, the peripheral edges of which slide along the internal cylindrical surface of the body portion 16. Means, not shown, may be provided to insure that the vanes 17 are disposed in the outermost positions by such interior body surface.

The inlet to compressor 13 is through a pipe or conduit 18 which communicates with a crescent-shaped chamber or suction port 19, the latter being formed in portion 16 and communicating with a large portion of chamber 14. The outlet from the compressor is illustrated to comprise three outlet ports 21 (FIGS. 2 and 3) which are formed in body portion 16 and extend radially-outwardly to a manifold passage 22. One end of passage 22 is closed or blind, whereas the other end communicates with a port 23 (FIGS. 1 and 3) with which is associated the discharge or outlet conduit 24 of the compressor apparatus. The port 23 is formed in one of two disc-shaped end plates 26 and 27 of the compressor body, such plates being suitably secured (as by bolts, not shown) to opposite end surfaces of central body portion 16.

It is pointed out that the end plate 27 is interposed between compressor portion 16 and motor 10, and is provided with a central opening and bearing means (not shown) for the rotor shaft 11. The outer end plate 26 may also be provided with bearing means (not shown) for shaft 11.

The motor 10 drives rotor 12 in a counterclockwise direction, as viewed in FIG. 2. Furthermore, the outlet ports 21 are angularly spaced (in the direction of rotor rotation) a large distance from suction port 19 (for example in the illustrated embodiment, at least 180 degrees from the lowermost end of such suction port 19). In addition, and as is conventional in rotary vane pumps or compressors, the region of rotor 12 adjacent outlet ports 21 is relatively close to such ports but does not touch the same, whereas the diametrically-opposite region of the rotor is spaced a substantial distance from the opposed internal cylindrical wall of body portion 16.

As the rotor 12 rotates counterclockwise as viewed in FIG. 2, the vanes 17 force vapor ahead of them through the compression chamber 14. Since the region of such chamber exterior to rotor 12 becomes progressively smaller in size as the outlet ports 21 are approached, the vapor is compressed and then passed through ports 21 to manifold passage 22 and thence to outlet pipe 24.

Formed through the wall of central body portion 16 are a multiplicity of parallel passages or conduits 29–35, inclusive, each such passage being parallel to the axis of such body portion. Two of the passages numbered 29 and 30, are disposed on opposite sides of the manifold passage 22 through which the compressed refrigerant discharges. The remaining passages, numbered 31–35, inclusive, are disposed at progressively lower elevations (FIG. 2) on the right wall of body portion 16. Thus, the passages or conduits 29–35 are disposed generally adjacent, and in effective heat-exchange relationship with, the regions of the compressor which tend to become hot during the high-speed counterclockwise rotation of rotor 12. In particular, passages or conduits 29 and 30 are in effective heat-exchange relationship with the hottest parts of the compressor (namely, the discharge end at compression chamber 14, the ports 21, and manifold passage 22).

The various passages 29–35 are interconnected with each other, the connection in the present embodiment being in series relationship by means of various connector passages 36–41, inclusive, as best shown in FIG. 3. Connector passages 36–41 are provided in the interior surfaces of the end plates 26 and 27, and each such passage interconnects two adjacent ones of the respective passages 29–35. Thus, for example, passage 36 connects the right ends of passages 29 and 30; passage 37 connects the left ends of passages 30–31, etc.

Liquid refrigerant is introduced into passage 29 through a pipe or conduit 43 which communicates with an inlet port 44 leading to such passage 29. In thus passing from pipe 43 to passage 29, the liquid flows through an expansion valve, orifice or other device which is schematically represented at 46 and which is preferably controllable in such manner as to regulate the rate of liquid flow therethrough.

Because the liquid when entering passage 29 has just passed through the expansion valve or orifice 46, and because there is such effective heat transfer with hot parts of the compressor, the liquid progressively vaporizes as it passes along the long and tortuous path formed by passages 29, 36, 30, 37, 31, 38, 32, 39, 33, 40, 34, 41 and 35. The number and size of such passages, and the rate of refrigerant flow therethrough, are preferably so selected that the refrigerant will have completely vaporized by the time the outlet from passage 35 is reached. Therefore, preferably, no liquid refrigerant is injected into the compression chamber 14.

The outlet from passage 35, and into compression chamber 14, is a port 47 which communicates with the chamber 14 at a region isolated from suction port 19, so that the suction of the compressor is not interfered with by injection of vapor from passage 35. Referring to FIG. 2, it will be noted that two vanes 17 are interposed between port 47 and the adjacent portion of suction port 19. Even after the rotor 12 has rotated counterclockwise until one of the vanes 17 passes by the port 47, there is still one vane 17 between port 47 and suction port 19, so that suction at the port 19 is at no time reduced.

Means are provided to oil the rotor 12 and the wall of body portion 16, and comprise an oil source 48 (FIGS. 1 and 3) which connects with a passage 49 in portion 16 and thus with a small-diameter passage 50 leading to a central region of the cylindrical interior wall of portion 16. Oil under pressure is introduced from source 48 through passages 49 and 50 to the compression chamber, and effects lubrication of the various surfaces as well as maintaining effective sealing contact between the peripheral edges of vanes 17 and the opposed wall. After leaving the compressor, the oil is separated from the refrigerant and recirculated to source 38. There is no requirement for any cooling of the oil in such source.

Figure 4:
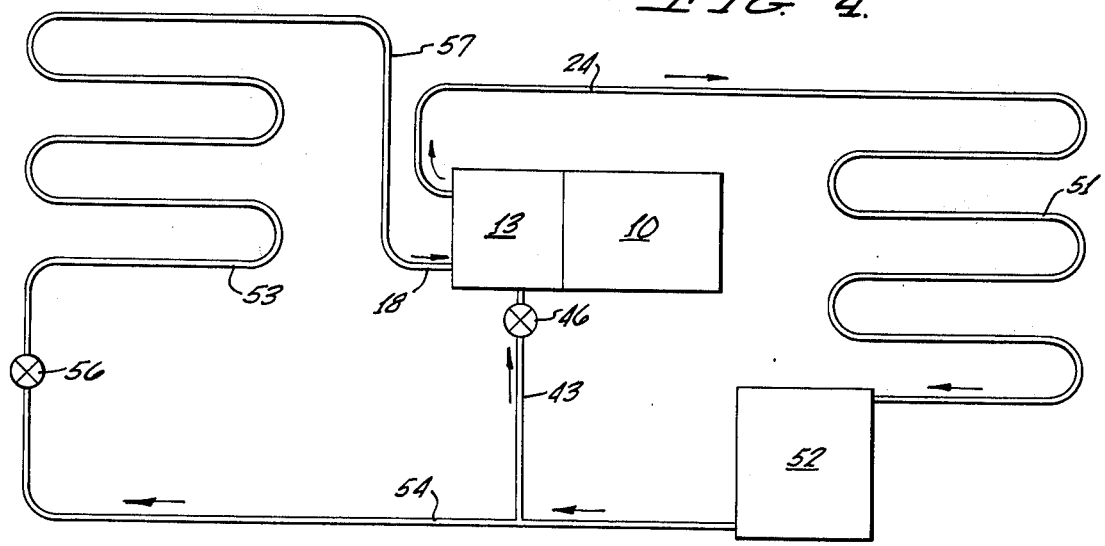
FIG. 4 is a schematic diagram of the refrigeration system.

Referring next to FIG. 4, the compressor 13 is shown as incorporated in a refrigeration system comprising condenser 51, liquid receiver 52, and evaporator 53. The outlet pipe 24 from compressor 13 connects to one end of condenser 51, whereas the other end of the condenser connects to the liquid receiver 52. A pipe 54 connects to the lower portion of receiver 52 and extends to an expansion valve or orifice 56, the latter discharging into the evaporator 53. Evaporator 53, in turn, is connected through a pipe 57 to the inlet conduit 18 leading to the compressor.

The pipe 43 connects between pipe 54 and the expansion valve or orifice 46. Therefore, liquid refrigerant from receiver 52 passes in parallel through both expansion valves 46 and 56 to evaporator means and thence to the compression chamber.

The present apparatus and method are useful in conjunction with substantially any type of conventional refrigerant which alternately vaporizes and condenses. For example, the refrigerant may be a Freon (fluorinated hydrocarbon). "Refrigerant 12", sold by DuPont, Dow Chemical, etc., is satisfactory.

METHOD OF THE INVENTION

In accordance with the present method, and with particular reference to the apparatus described re FIGS. 1–4, the main body of liquid refrigerant from receiver 52 is passed through expansion valve 56 to evaporator 53, where it vaporizes and effects cooling of any desired space or object. The main body of vaporized refrigerant is then passed through pipe 57 and inlet pipe 18 into suction port 19, following which it is compressed in compression chamber 14 (as described above relative to FIG. 2) and then discharged through ports 21 into outlet manifold 22 and thus to outlet pipe 24.

A portion of the liquid refrigerant from receiver 52 is passed directly (through pipe 43 and expansion valve 46) to the tortuous path or circuit (FIG. 3) through the housing of the compressor. As indicated above, the rate of refrigerant flow, the length of the tortuous path, etc., are so regulated that the refrigerant progressively vaporizes as it passes along the path and is (preferably) one hundred percent vapor by the time it passes through port 47 into compression chamber 14. The vapor thus injected into compression chamber 14 is compressed by the compressor, along with the vapor introduced therein through inlet pipe 18 and the suction port 19. Thus, the vapor from the tortuous cooling path through the compressor housing is likewise discharged through ports 21, manifold 22 and outlet pipe 24.

The vapor from the main pump circuit and from the auxiliary pump-cooling circuit is therefore simultaneously passed to the condenser 51 and condensed therein (by suitable air cooling means, water cooling means, etc.). The refrigerant is then introduced into the liquid receiver 52, following which the cycle repeats.

The present method thus employs the latent heat of vaporization to compensate for the heat of compression generated in chamber 14. However, such latent heat is not utilized by effecting vaporization within chamber 14, but instead by effecting vaporization within the tortuous path which is in effective heat-exchange relationship with chamber 14 and with the outlets 21 and 22 therefrom.

The compressor therefore operates at a relatively low temperature. When the compressor is driven at very high speeds, the volume of refrigerant passed through the compressor may be very large in comparison to its size. Thus, the compressor may be very small and light. Furthermore, because the compressor remains relatively cool, lubrication problems, generation of substantial amounts of carbon, etc., are prevented. There is no need for effecting cooling of the oil, since the compressor does not get so hot that excessive oil heating occurs. Heat insulation means, not shown, may be provided around the compressor if it is operating in a hot environment.

There is only a low superheat developed in the compressor, due to the relatively low temperature thereof. Because, in the preferred form, no liquid refrigerant is injected into the compression chamber, refrigerants (such as Freon) which are often harmful to the lubricant from source 48 do not provide a substantial adverse effect, as would be the case if the refrigerants were injected in liquid form.

It is emphasized that the present method effects constant cooling of the compressor, and permits the liquid to enter the compressor in liquid form and then fully vaporize. This may be contrasted with prior-art systems wherein the liquid refrigerant was injected directly into the compression chamber, or was directed to a cooling chamber from an oil cooler at which partial vaporization occurred. It is also emphasized that the present method makes use of relatively large cooling surfaces, namely the cylindrical surfaces of the various passages, which creates a very great heat-sink action relative to the heat generated in compression chamber 14. Very importantly, the vaporizing refrigerant (not merely refrigerant liquid, or refrigerant vapor) is constrained to flow adjacent and in excellent heat-transfer relationship with the hottest parts of the compressor.

Although the refrigerant which is vaporized in the tortuous path is necessarily recompressed in compression chamber 14, and then condensed in condenser 51, there is a net efficiency gain in comparison to what would be the case if the present compressor cooling method were not employed.

The expansion valve 46 is preferably located immediately adjacent the tortuous path through the compressor body. It is to be understood, however, that the expansion valve may be spaced somewhat away from the compressor, particularly if the interconnecting piping is adequately insulated against heat transfer.

As previously indicated, each of the expansion means 46 and 56 may be adjustable in order to regulate the amount of flow through each of the two parallel circuits. Alternatively, other control valving may be incorporated in the circuit, as described below.

EMBODIMENT OF FIGS. 5-7

In the present embodiment, an electric motor 58, or other prime mover, is employed to drive a crank 59 (FIG. 7) which is rotatably mounted in a housing 60 and is linked through a piston rod 61 to a piston 62. The piston 62 is thus reciprocated vertically in a cylinder 63 (and in an upward extension of housing 60). The upper end of cylinder 63 is closed by a valve plate 64.

Valve plate 64 has mounted thereon two valves, which are schematically represented as reed valves or other suitable check valves. One of the reeds (numbered 66) is on the inside of the cylinder, whereas the other of the reeds (numbered 67) is on the outside thereof. The last-mentioned (outer) reed is disposed in an auxiliary housing 68.

A pipe 69 from evaporator 70 extends through the valve plate 64 to the inner reed 66, the result being that vapor is drawn into cylinder 63 when the piston 62 moves downwardly and thus effects opening of the inner reed 66.

The auxiliary housing 68 for outer reed 67 has connected thereto a pipe 72 which connects to condenser 73. The outer reed 67 opens in response to each upstroke of piston 62, such upstroke discharging compressed gas through an outlet port 74.

The refrigeration system further comprises a liquid receiver 76 connected to condenser 73, and a pipe 77 extending from receiver 76 to the expansion valve or orifice 78 leading to evaporator 70.

Refrigerant in substantially entirely liquid form is introduced into cooling passage or conduit means in the compressor. Thus, a pipe 80 is connected to pipe 77 and also to an expansion valve or orifice 81 located adjacent valve plate 64. The outlet from the expansion valve 81 connects to a vertical bore or passage 82 and then flows in series through a relatively large number of passages which are connected in tortuous series-circuit relationship generally in the manner described in detail relative to the previous embodiment. These passages, all of which extend through the cylinder wall parallel to the axis thereof, are numbered 83–96 in FIG. 6.

The connection between the lower ends of passages 82 and 83 is effected by a passage 100 formed through a plate 101 (FIG. 5) which seats on the upward extension of housing 60. Similarly, the connection between the upper ends of passages 95 and 96 is effected through a passage 102 formed in the underside of valve plate 64.

In like manner, the lower ends of passages 84–85, 86–87, 88–89, 90–91, 92–93, 94–95 are connected to each other. Also, the upper ends of passages 83–84, 85–86, 87–88, 89–90, 91–92, and 93–94 are connected. In the showing of FIG. 6, downward flow of refrigerant is indicated by a substantially solid dot in the middle of each passage, whereas upward flow is denoted by an open small-diameter circle.

The lower end of passage 96 communicates through a port 97 with the region of the cylinder which is immediately above the upper surface of piston 62 when the latter is at the lowermost part (bottom) of its stroke (as shown in FIG. 7). Thus, port 97 is blocked by the side wall of piston 62 at all times except when the piston is at or near the bottom of its stroke. This being the case, the introduction of vapor from the tortuous path through port 97 does not substantially interfere with the cylinder suction which draws vapor from pipe 69 and through the reed valve 66.

In the method as employed relative to the embodiment of FIGS. 5–7, the liquid refrigerant flows through the expansion valve or orifice 81 and progressively vaporizes as it passes through the above-described tortuous path. By the time the inlet port 97 is reached, in the preferred embodiment of the invention, the refrigerant is substantially completely vaporized. The vapor thus injected into the cylinder 63 is compressed upon the next upstroke of the piston 62, just as the vapor introduced through reed valve 66 is compressed. The vapor from both sources is discharged through outlet port 74 and reed valve 67 to pipe 72 and thus to the condenser 73.

The theory of operation relative to the embodiment of FIGS. 5–7 is similar to that described in detail above relative to the previous embodiment. Thus, the vaporizing refrigerant in the tortuous path operates to absorb the heat of compression created in the cylinder (compression chamber), with numerous attendant benefits as stated heretofore.

Relative to the embodiment of FIGS. 5–7, it is pointed out that valve plate 64 (and the compressor head) are also subject to major heating effects. Therefore, the present invention also contemplates the extension of the tortuous path (namely, the described passages) through the valve plate, head, etc., as described in the third embodiment below, in order that the vaporizing refrigerant will achieve effective cooling of these parts also.

The compressor is lubricated by oil which is present in housing 60. Some of the oil circulates with the refrigerant, and some of the oil splashes between the piston and the lower regions of the housing. The present invention eliminates the need for providing a cooler for such oil.

EMBODIMENT OF FIGS. 8–11

In the present embodiment, a prime mover (not shown) is employed to drive a crank 59a which is rotatably mounted in a housing 60a and is linked through a piston rod 61a to a piston 62a. Piston 62a is thus reciprocated vertically in a cylinder 102 (and in an upward extension of housing 60a). The upper end of cylinder 102 is closed by a cylinder head — valve plate assembly comprising a stacked set of four plates 103, 104, 105, and 106. The two lower ones (103 and 104) of these plates combine to form the valve plate, whereas the two upper ones (105 and 106) combine to form the cylinder head.

The lowermost plate 103 has mounted on the lower surface thereof (the surface region exposed to the inside of cylinder 102) a compressor inlet valve 66a, which may be a reed valve or other suitable check or one-way flow valve. A compressor inlet pipe 69a communicates with valve 66a through a vertical bore or passage 107 in plates 103–106.

A compressor outlet valve 67a, also a reed valve or other type of check or one-way flow valve, is mounted on the upper surface of plate 104. A rectangular recess 108 is formed in the bottom of plate 105 above valve 67a to accommodate movement thereof. A compressor outlet pipe 72a communicates with the recess 108 (and thus with the upper side of valve 67a) via a vertical bore or passage 109 through plates 105 and 106. The inside of cylinder 102 communicates with the lower side of valve 67a through a vertical bore or passage 110 in plates 103 and 104.

The refrigeration system of the present embodiment further comprises a condenser 73a (FIG. 9) which is connected at one end to outlet pipe 72a, and at the other end of liquid receiver 76a. One side of evaporator 70a is connected to inlet pipe 69a, and the other side to an expansion valve 78a which is in turn connected (by a pipe 77a) to the outlet of liquid receiver 76a.

A pipe 80a is connected to pipe 77a and also to an expansion valve or orifice 81a. The outlet side of valve 81a is connected, by a pipe 111, to a radial bore or passage 112 (FIG. 10) which extends from an upper side region of cylinder 102 partially (for example, about two thirds) through the side wall of such cylinder. The inner end of passage 112 intercepts the first of multiple, upwardly and downwardly-inclined bores or passages 113–130 (FIG. 10) which are formed through cylinder 102 and are connected in tortuous, series-circuit relationship around the inner wall thereof.

Each passage 113–130 is straight, being inclined relative to the adjacent passage so that they join at either the lower or the upper surface of cylinder 102. Each adjacent pair of passages thus has the form of a V or an inverted V. In this manner a continuous passage, almost completely around cylinder 102, is provided by passages 113–130 without the necessity for forming connecting passages (such as passages 94, 100 and 102 of FIG. 5, or passages 37–41 of FIG. 1) in the upper and lower regions of cylinder 102 (or in adjacent structure).

Figure 8:
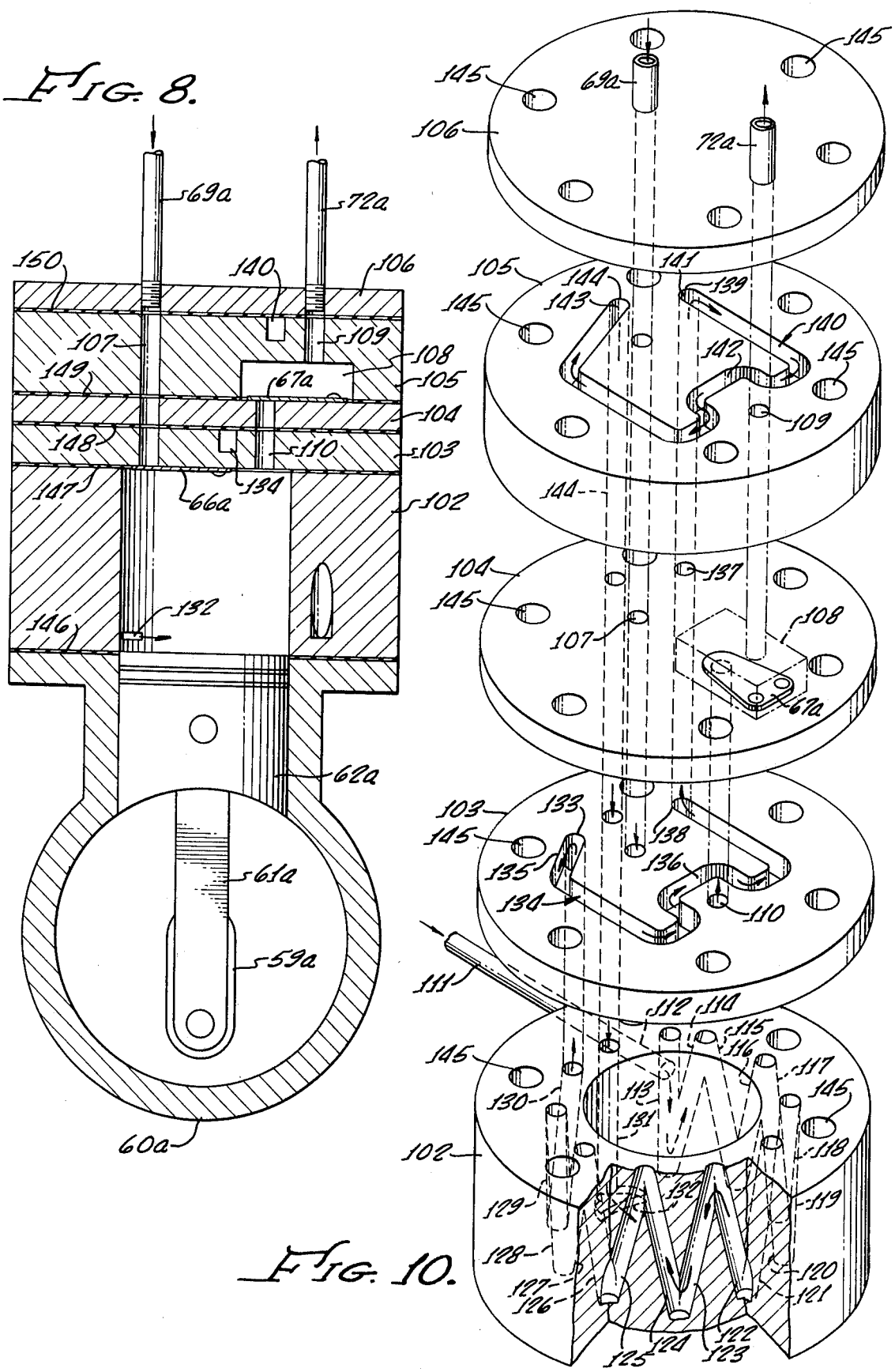
FIG. 8 is a vertical sectional view of the compressor of a third embodiment of the invention.

The first passage 113 and the last passage 130 are located on opposite sides of a single vertical passage 131 formed in cylinder 102, and through which refrigerant vapor is directed downwardly to a port 132 located above the upper surface of piston 62a (when the piston is at the bottom of its stroke, FIG. 8). The port 132 may be formed in the shape of a horizontal crescent.

A vertical bore or passage (conduit) 133 (FIG. 10) is formed through plate 103, in registry with the upper end of the cylinder passage 130. A tortuous, generally W shaped, groove or passage 134 (FIGS. 8 and 10) is formed in the upper surface of plate 103, being connected at one end 135 to passage 133. A central loop 136 of passage 134 closely surrounds the compressor outlet passage 110 on three sides, to provide effective cooling of plates 103 and 104 in this region. The bottom surface of plate 104 forms the top wall of passage 134.

A vertical bore or passage (conduit) 137 is formed through plate 104 in registry with the other end 138 of passage 134. In registry with passage 137, a vertical bore or passage 139 is formed through plate 105. In the upper surface of plate 105, a second tortuous groove or passage 140 (FIGS. 8 and 10), generally similar in shape to the passage 134, is formed, one end 141 thereof being connected to the passage 139. A central loop 142 of passage 140 closely surrounds three sides of the compressor outlet passage 109 to cool plates 105 and 106 in this region. The other end 143 of the passage 140 connects to a vertical bore or passage 144 through plate 105 and extends downwardly through plates 103 and 104, in registry with passage 131 in cylinder 102. The bottom surface of plate 106 forms the top wall of passage 140.

Thus, a continuous tortuous conduit or passage means, comprising the series-interconnected passages 112, 113–130, 133, 134, 137, 140, 143, 144 and 131, is formed in plates 103–106 and in cylinder 102.

A plurality of vertical apertures 145 (six being shown, FIG. 10) are equally spaced near the periphery of plates 103–106 and cylinder 102 to provide for connecting such plates and the cylinder to the upper extension of the compressor body 60a by bolts (not shown). Sealing gaskets 146–150 are provided between mating surfaces of the housing 60a, cylinder 102 and plates 103–106 (FIG. 8).

In the method as taught relative to the embodiment of FIGS. 8–11, the liquid refrigerant from pipe 80a flows through valve 81a and progressively vaporizes as it passes along the above-described long tortuous path through the passage or conduit means. The portion of such tortuous path comprising passages 113–130 causes effective cooling of cylinder 102, whereas the portion of such path comprising passages 134, 140, etc., causes effective cooling of plates 103–106.

In particular, the loop 136 of passage 134, and the loop 142 of passage 140, cause efficient cooling of those portions of plates 103–106 adjacent the compressor outlet passages 110 and 109. These regions around passages 109 and 110 are subject to great heating due to the outflow of compressed refrigerant from the compressor, not only because of the superheat of such refrigerant as it leaves the compressor, but also because of the frictional or "wire drawing" effect as the refrigerant flows through the small passages and through outlet valve 67a.

By the time port 132 is reached, the refrigerant in the tortuous pathway is substantially completely vaporized so that (in the preferred form) no liquid refrigerant is introduced into the cylinder 102. The vapor thus injected into cylinder 102 is compressed during the next upstroke of piston 62a, just as vapor introduced through valve 66a is compressed. The compressed vapor from both sources is discharged through passage 110, valve 67a and passage 109 to pipe 72a and thus to the condenser 73a.

SUMMARY

There has thus been described a method and apparatus wherein there is extremely effective and efficient heat transfer between the vaporizing refrigerant and the hot regions of the compressor, including the hottest regions thereof. Not only is the cylinder wall well cooled, but the valve plate (elements 103 and 104) and the head (elements 105 and 106) in the piston-type compressor are well cooled. The vaporizing refrigerant is forced to pass the hottest compressor regions — in very efficient heat-transfer relationship therewith — so that no part of the compressor overheats. There is no possibility of vapor lock.

The described compressor-cooling method and apparatus are so effective that there is no need for an oil cooler, such as is common in the prior art. In the present method and apparatus the oil need not be cooled since the compressor does not become so hot as to excessively heat the oil. Since no oil cooler is needed or used, there is a substantial saving in cost, bulk, and complexity, and there is improved operation.

In the present method and apparatus, refrigerant is delivered to the expansion valve and to the cooling passage or conduit means in substantially one hundred percent liquid form, and preferably leaves such passage or conduit means in substantially one hundred percent vapor form. The liquid progressively vaporizes along almost the full length of the long passage or conduit means — becoming substantially one hundred percent vapor only as the inlet 132 to the compression chamber is closely approached. The described progressive vaporization along a long path which is in very good heat-sink (heat transfer) relationship to the hot parts of the compressor is one of the major features of the invention. Because of this relationship (and contrary to the situation which occurs relative to an open chamber), the present compressor operates well whether it is right side up, upside down, or on its side, this being of much importance in (for example) multi-piston compressors wherein some cylinders are vertical, some horizontal, and/or some inclined.

Another of the reasons why the present passage or conduit means are satisfactory, whereas an open chamber is not, is that liquid in a chamber tends to be forced (by its vapor) away from hot spots, and the hot spots are the very places where liquid is most needed. With the passage or conduit means, the liquid is forced to pass adjacent the hot spots.

After the refrigerant vapor reaches the port 132 it enters the compression chamber without interfering substantially with the compressor suction, this being another major feature of the invention.

The various passage or conduit means of the present invention, through which vaporizing refrigerant is passed to thus cool the hot regions of the compressors, have diameters less than one-fourth the diameter of the compression chamber (namely, less than one-fourth the piston diameter in piston-type compressors, and less than one-fourth the rotor diameter in rotary compressors). Preferably, the diameters of the passage or conduit means are less than one-sixth the compression-chamber diameters, a diameter ratio of one to eight being often desirable. Such passages are not "chambers", are not subject to vapor lock, and are not subject to malfunction due to tilting or inversion of the compressor, and are characterized by a high-degree of heat-transfer capability. The passage or conduit means need not be circular in section but may (for example) be square or somewhat rectangular in section For large systems, more than one "pass" of the passage or conduit means may be provided past crucial hot regions. Furthermore, some degree of paralleling of the passage or conduit means is sometimes desirable. What is not desirable is to have open chambers, annular or otherwise, which are subject to the numerous inadequacies and malfunctions stated above.

It is distinctly undesirable, and usually intolerable, that a mixture of liquid and vapor (as distinguished from liquid alone) be supplied to the valve or orifice 81a. This would result in undesired erratic operations of the system. On the other hand, it is in some systems tolerable (although also undesirable) to permit a small amount of injection of refrigerant liquid from port 132 (or its equivalent) into the compression chamber. To achieve various benefits, including the prevention of refrigerant liquid injection (which is undesired) into the compression chamber, control means may be provided as described below.

The present control means are such that there is no association with any oil cooler or oil circuit, which produces the important benefit that there is no time lag or slowness of temperature-control operation. In accordance with one aspect of the control means, a very fast and simple control is achieved by using pressure to regulate temperature, especially the minimum temperature of the compressor.

CONTROL MEANS

The first control means is a flow control valve, preferably a modulating valve, which is shown at 152 and is provided in line 80a adjacent expansion valve or orifice 81a. Actually, valves 81a and 152 are combined into a single valve which is shown at V, the discussion relative to two valves being for theoretical purposes only.

Valve 152 is controlled by a temperature-responsive bulb 153 which is in thermal contact with the compressor at a region thereof adjacent a relatively downstream portion of the abovedescribed passage or conduit means. Thus, bulb 153 is shown as being in contact with plate 106 near the upper end of passage 144. Valve 152 and bulb 153 combine to insure that liquid refrigerant will be present in all but the downstream portions of the passage or conduit means.

Should the setting of valve 152 be such that the refrigerant in the passage or conduit means vaporizes fully before reaching the vicinity of bulb 153, the cooling action in such vicinity will be minimal and the bulb will become warm. The bulb will then cause valve 152 to open further, causing more refrigerant liquid to enter the passage or conduit means. There will then be vaporizing refrigerant present near the bulb, which will cause it to cool and thus effect a partial closing action relative to valve 152.

The characteristics of the valve 152 and the associated bulb 153 are caused to be such that some cooling action occurs near the downstream end of the passage or conduit means. However, they are also caused to be such that the refrigerant in passages 144 and 131 will be substantially entirely vapor. In the described manner, therefore, effective compressor cooling is achieved without injecting substantial amounts of refrigerant liquid through port 132 into the compression chamber.

The second control means is pressure responsive, the pressure in the elongated passage or conduit being employed to insure that the temperature of the compressor does not fall below a desired minimum. If the compressor is excessively cold when it operates, the lubricating oil will be so viscous that undesired inefficiencies will result.

To prevent overcooling, an evaporator pressure regulating valve 154 (FIGS. 9 and 11) is installed in cylinder 102, in a position to regulate the refrigerant flow from passage 131, through port 132, and into the inside of cylinder 102. The valve 154 comprises a housing 155 having mounted therein a diaphragm 156. A compression spring 157 is positioned to one side of diaphragm 156 (radially outwardly therefrom in respect to the valve as installed in cylinder 102). Compression of spring 157 is controlled by an adjustment screw 158 which projects outwardly through housing 155. Diaphragm 156 is connected at its center, on the side opposite spring 157, to an elongate throttling pin 159 whose conical end 160 is located inwardly (toward the inside of cylinder 102) beyond a threaded housing portion 161 which is threaded into the cylinder. The conical end 160 mates with a tapered opening 162 of port 132, so that such port may be completely closed to stop flow of refrigerant therethrough.

The pressure-regulating valve 154 maintains the compressor operating temperature generally above some predetermined minimum temperature (for example, one hundred degrees Fahrenheit, at which the oil flows freely) by regulating the flow of vapor through the port 132 in response to the pressure of the vapor in passage 131 adjacent such port. When cylinder 102 is hot, the pressure of the vapor acting on the inner side of the diaphragm 156 forces the diaphragm outwardly against the pressure of spring 157, opening the port 132 for passage of the vapor between the valve pin end 160 and the wall of opening 162. When the cylinder 102 starts cooling substantially, the vapor pressure in passage 131 decreases and the spring 157 forces the pin end 160 closer to opening 162, thereby restricting or blocking the flow of refrigerant through the tortuous path and preventing the cylinder from becoming too cold. By means of screw 158 the compression of spring 157 is adjusted to vary the minimum temperature at which the compressor will operate. An increase in spring compression, for example, elevates such minimum temperature by reducing refrigerant flow through the tortuous passage.

With the described controls, the present compressor system will operate well in various environments, including very hot and very cold, and under widely different load conditions. The controls respond directly and quickly to conditions at the compressor itself, thus assuring that neither overheating nor overcooling will result at any region, In the cited U.S. Pat. No. 3,397,033, on the other hand, the starting of substantial flow of compressor-cooling refrigerant is dependent upon oil temperature, thus introducing a time lag which may result in overheating. (In FIG. 1 of such patent, valve 40 reduces flow until the oil in line 26 heats. In FIG. 4 thereof, bulb 101 overrides bulb 106 to throttle the valve 100 until the oil in line 86 heats.)

Figure 11:
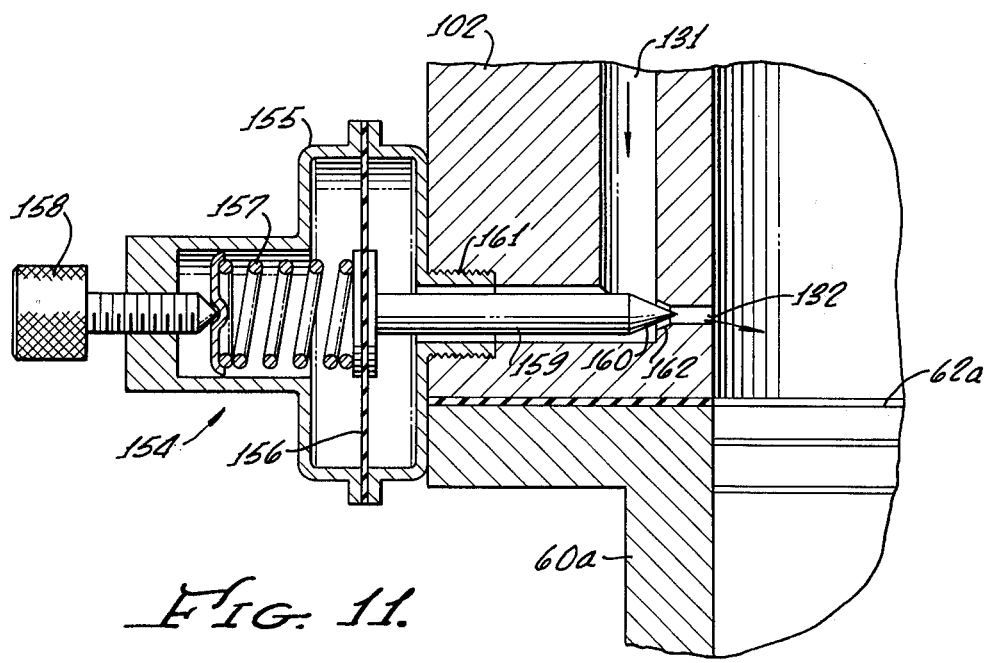
FIG. 11 is an enlarged vertical sectional view showing the evaporator pressure regulating valve.

As an illustration, let it be assumed that (in the present system) the oil is cold when the system is first set into operation. The pressure responsive means 154 will nevertheless open as soon as the metal of the compressor heats to expand the vapor and thus overcome spring 157 (FIG. 11). The valve 152 will also be open, as soon as the compressor metal heats to result in heating of bulb 153. In neither case is there any necessity to wait for heating of the oil, thus there is very fast start-up of flow of coolant refrigerant as soon as it is needed. The possibility of damage to the compressor or the oil therein is thus minimized.

Throughout the appended claims, when reference is made to a "vapor" and to a "liquid corresponding to said vapor", etc., it is meant that the vapor is that of said liquid. Thus, for example, when the "vapor" is vaporized "Freon" (a fluorinated hydrocarbon), then the "liquid corresponding to said vapor" is liquid "Freon".

Although the present system has been described with particular emphasis to small, light, high-speed systems (as in airplanes or automobiles), it is to be understood that there is also much need for the present invention in large systems, both single-and multi-stage. For example, there are numerous applications relative to cooling display regions for frozen foods in supermarkets. Other applications relate to the fields of supercooling, etc.

Figure 9:
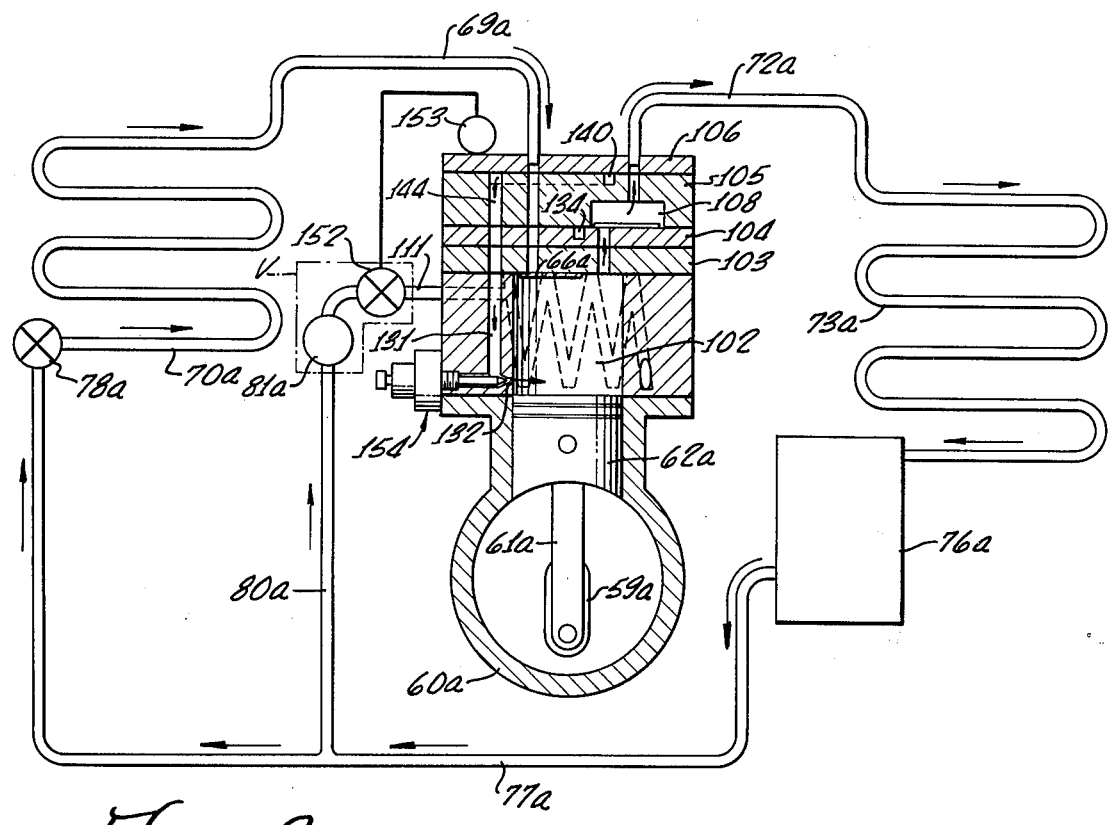
FIG. 9 is a schematic diagram of the refrigeration system incorporating the compressor of FIG. 8.

Relative to the first (rotary compressor) embodiment of the invention, it is to be understood that the various cooling passages may be zig zag, instead of parallel to the axis, as described relative to the third embodiment (FIGS. 9 and 10).

In the present specification and claims, when reference is made to such terms as "hot spots", it is to be understood that what is meant are those regions which are — in the absence of effective cooling by the present invention — hot in conventional compressors.

The precise location of bulb 153 (FIG. 9) depends upon the actual compressor. It is, for example, possible to place bulb 153 in an opening in plate 105, to thus increase the length of the path along which the refrigerant dries (vaporizes) before reaching the compression chamber. The bulb is then still in a relatively downstream location but spaced (even further) from the port 132.

There are various commercially available valves V which may be used to replace the two valves 81a and 152 of FIG. 9, it being again pointed out that only one valve (not two) is actually used. For example, the valve may be a Model PC3FW-110-1/2-5/8, manufactured by Parker Hannifin Company of Cleveland, Oh.

The word "orifice", as employed in this specification and claims, is to be understood as comprehending such things as capillary passages, particularly since in some of the simplest forms of the present invention a capillary passage may be employed in place of (for example) valve V (FIG. 9), that is to say in place of valve 81a–152.

The foregoing detailed description is to be clearly understood as given by way of illustration and example only, the spirit and scope of this invention being limited solely by the appended claims.

I claim:

1. A method of compressing a vapor, which comprises:
   a. providing a rotary-vane mechanical compressor having a compression chamber therein and incorporating a vane-type rotor to compress vapor in said compression chamber,
   b. introducing a vapor into the intake of said compressor for compression in said compression chamber and subsequent discharge out the outlet of said compressor,
   c. supplying to the vicinity of said compression chamber a liquid corresponding to said vapor,
   d. effecting vaporization of said liquid while the vaporizing liquid is in heat-exchange relationship with said compression chamber but is not contained in said compression chamber,
      whereby the latent heat of vaporization of said vaporizing liquid is employed to cool said compression chamber and compensate for the heat generated due to compression of said vapor introduced into said compressor intake, and
   e. mixing the vapor resulting from said vaporization with said vapor introduced into said compressor intake,
      said mixing being performed by injecting said vapor resulting from said vaporization into said compression chamber at a region of said chamber so correlated to the vanes of said rotor that there is always at least one vane interposed between said region and said compressor intake,
      whereby said injection will not interfere substantially with the suction present at said compressor intake.

2. A method of compressing a vapor, which comprises:
   a. providing a piston-type mechanical compressor having a compression chamber therein and incorporating a reciprocating piston to compress vapor in said compression chamber,
   b. introducing a vapor into the intake of said compressor for compression in said compression chamber and subsequent discharge out the outlet of said compressor,
   c. supplying to the vicinity of said compression chamber a liquid corresponding to said vapor,
   d. effecting vaporization of said liquid while the vaporizing liquid is in heat-exchange relationship with said compression chamber but is not contained in said compression chamber,
      whereby the latent heat of vaporization of said vaporizing liquid is employed to cool said compression chamber and compensate for the heat generated due to compression of said vapor introduced into said compressor intake, and
   e. mixing the vapor resulting from said vaporization with said vapor introduced into said compressor intake,
      said mixing being performed by injecting said vapor resulting from said vaporization into said compression chamber at a region of said chamber so correlated to the lowermost position of said piston that said region is adjacent the upper end of said piston when it is at said lowermost position,
      whereby said injection will not interfere substantially with the suction present at said compressor intake.

3. A refrigeration system, which comprises:
   a. a mechanical compressor having a compression chamber therein,
      said compressor being a vane-type rotary compressor,
   b. a condenser having its inlet connected to the discharge port of said compressor,
   c. an evaporator having its outlet connected to the suction port of said compressor,
   d. means to connect the outlet of said condenser to the inlet of said evaporator,
      said means including an expansion means,
   e. a refrigerant contained in said compressor, condenser, evaporator and connector means,
      said refrigerant being of a vaporizable type which is evaporated in said evaporator and is condensed in said condenser,
   f. means to supply a portion of said refrigerant, when in liquid form, to said compressor and to effect vaporization of said portion while said portion is in effective heat-exchange relationship to said compression chamber but is not contained in said compression chamber,
      whereby the latent heat of vaporization of said portion is employed to compensate for the heat of compression generated in said compression chamber, and
   g. means to mix the vapor produced by said vaporization of said portion with the vapor which passes from said evaporator through said compressor to said condenser,
      said mixing means comprising means to inject into said compression chamber said vapor produced by said vaporization of said portion,
      said injection means being so related to said chamber that the suction present at said suction port is not substantially reduced,
      said injection means communicating with said compression chamber at a location so correlated to the vanes of said compressor that at least one of said vanes is always interposed between said location and said suction port.

4. A refrigeration system, which comprises:
   a. a mechanical compressor having a compression chamber therein,
      said compressor being a piston-type compressor having a reciprocating piston,
   b. a condenser having its inlet connected to the discharge port of said compressor,
   c. an evaporator having its outlet connected to the suction port of said compressor,
   d. means to connect the outlet of said condenser to the inlet of said evaporator,
      said means including an expansion means, e. a refrigerant contained in said compressor, condenser, evaporator and connector means,
said refrigerant being of a vaporizable type which is evaporated in said evaporator and is condensed in said condenser,
f. means to supply a portion of said refrigerant, when in liquid form, to said compressor and to effect vaporization of said portion while said portion is in effective heat-exchange relationship to said compression chamber but is not contained in said compression chamber,
whereby the latent heat of vaporization of said portion is employed to compensate for the heat of compression generated in said compression chamber, and
g. means to mix the vapor produced by said vaporization of said portion with the vapor which passes from said evaporator through said compressor to said condenser,
said mixing means comprising means to inject into said compression chamber said vapor produced by said vaporization of said portion,
said injection means being so related to said chamber that the suction present at said suction port is not substantially reduced,
said injection means communicating with said compression chamber at a location which is adjacent the upper end of said piston when said piston is at the bottom of its stroke.

5. A refrigeration system, which comprises:
a. a mechanical compressor having a compression chamber therein,
said compressor being a rotary vane compressor,
b. a condenser having its inlet connected to the discharge port of said compressor,
c. an evaporator having its outlet connected to the suction port of said compressor,
d. means to connect the outlet of said condenser to the inlet of said evaporator,
said means including an expansion means,
e. a refrigerant contained in said compressor, condenser, evaporator and connector means,
said refrigerant being of a vaporizable type which is evaporated in said evaporator and is condensed in said condenser,
f. means to supply a portion of said refrigerant, when in liquid form, to said compressor and to effect vaporization of said portion while said portion is in effective heat-exchange relationship to said compression chamber but is not contained in said compression chamber,
whereby the latent heat of vaporization of said portion is employed to compensate for the heat of compression generated in said compression chamber, said supply means comprising elongated passage means through the wall of said compression chamber,
one end of said passage means communicating with the outlet of said condenser, and
g. means to mix the vapor produced by said vaporization of said portion with the vapor which passes from said evaporator through said compressor to said condenser,
said mixing means comprising port means interconnecting said compression chamber and the other end of said passage means,
said port means being disposed sufficiently far from said suction port that at least one vane of said compressor is always interposed between said port means and said suction port.

6. A refrigeration system, which comprises:
a. a mechanical compressor having a compression chamber therein,
said compressor being a piston-type compressor,
b. a condenser having its inlet connected to the discharge port of said compressor,
c. an evaporator having its outlet connected to the suction port of said compressor,
d. means to connect the outlet of said condenser to the inlet of said evaporator,
said means including an expansion means,
e. a refrigerant contained in said compressor, condenser, evaporator and connector means,
said refrigerant being of a vaporizable type which is evaporated in said evaporator and is condensed in said condenser,
f. means to supply a portion of said refrigerant, when in liquid form, to said compressor and to effect vaporization of said portion while said portion is in effective heat-exchange relationship to said compression chamber but is not contained in said compression chamber,
whereby the latent heat of vaporization of said portion is employed to conpensate for the heat of compression generated in said compression chamber, said supply means comprising elongated passage means through the wall of said compression chamber,
one end of said passage means communicating with the outlet of said condenser, and
g. means to mix the vapor produced by said vaporization of said portion with the vapor which passes from said evaporator through said compressor to said condenser,
said mixing means comprising port means interconnecting said expansion chamber and the other end of said passage means,
said port means communicating with said compression chamber at a location adjacent the upper end of the piston of said compressor when said piston is at the bottom of its stroke.

7. A method of cooling a mechanical compressor having a compression chamber defined by wall means, said compressor being incorporated in a mechanical refrigeration system of the type wherein a refrigerant alternately vaporizes and condenses, which comprises:
a. introducing liquid refrigerant into elongated conduit means which are in effective heat-exchange relationship with hot spots in said wall means defining said compression chamber of the mechanical compressor in said system,
b. effecting passage of said refrigerant through said conduit means and effecting progressive vaporization of said liquid refrigerant as it passes therealong.
thereby achieving cooling of said hot spots,
c. injecting vapor from said conduit means into the compression chamber of said compressor for compression therein along with the refrigerant in the primary refrigeration circuit of said refrigeration system, and
d. controlling the rate of said introduction of liquid refrigerant into said conduit means in direct response to the temperature at a region of said compressor which is near said conduit means at a section thereof spaced from the point of vapor injection from said conduit means into said compression chamber, and also spaced from the point of introduction of liquid refrigerant into said conduit means, said step (d) being so performed as to increase the rate of said introduction when the temperature at said region rises, and to decrease the rate of said introduction when the temperature at said region falls, said step (d) also being so performed as to cause the presence of liquid refrigerant in major portions of said conduit means.

8. The invention as claimed in claim 7 in which said method further comprises performing said step (a) by introducing said refrigerant in substantially one hundred percent liquid form, there being substantially no vapor at the point of introduction.

9. A method of cooling a mechanical compressor having a compression chamber defined by wall means, said compressor being incorporated in a mechanical refrigeration system of the type wherein a refrigerant alternately vaporizes and condenses, which comprises:
   a. introducing liquid refrigerant into elongated passage means which are in effective heat-exchange relationship with hot regions in said wall means defining said compression chamber of the mechanical compressor in said system,
   b. effecting flow of said refrigerant through said passage means and effecting progressive vaporization of said liquid refrigerant as it passes therealong, thereby achieving cooling of said hot regions,
   c. injecting vapor from said passage means into the compression chamber of said compressor for compression therein along with the main refrigerant in the refrigeration system, and
   d. controlling said injection of vapor from said passage means into said compression chamber in response to the vapor pressure in said passage means, said controlling step being such as to increase injection into said compression chamber when said vapor pressure is high, and decrease injection when said vapor pressure is low, thus preventing excessive flow of refrigerant through said passage means.

10. A method of cooling a mechanical compressor in a mechanical refrigeration system of the type wherein a refrigerant alternately vaporizes and condenses, which comprises:
   a. introducing liquid refrigerant into elongated conduit means which are in effective heat-exchange relationship with hot spots of the mechanical compressor in said system,
   b. effecting passage of said refrigerant through said conduit means and effecting progressive vaporization of said liquid refrigerant as it passes therealong, thereby achieving cooling of said hot spots,
   c. injecting vapor from said conduit means into the compression chamber of said compressor for compression therein,
   d. controlling said introduction of liquid refrigerant into said conduit means in response to the temperature at a region of said compressor which is relatively near said conduit means and is spaced from the point of vapor injection from said conduit means into said compression chamber,
   said step (d) being so performed as to increase the rate of such introduction when the temperature at said region rises, and to decrease the rate of said introduction when the temperature of said region falls, and
   e. controlling said injection of vapor from said conduit means into said compression chamber in response to the vapor pressure in said conduit means, said last-mentioned controlling step being such as to increase injection into said compression chamber when said vapor pressure is high, and decrease injection when said vapor pressure is low.

11. In a method of cooling a piston-type compressor in a mechanical refrigeration system of the type wherein refrigerant is alternately condensed and vaporized, said compressor having a valve plate at the upper end of the cylinder chamber and through which compressed refrigerant vapor is exhausted from said cylinder chamber upon the upstroke of the piston therein, the steps of:
   a. effecting flow of refrigerant liquid along an elongated path through an elongated passage in said valve plate, and
   b. effecting substantial vaporization of said refrigerant liquid as it thus flows along said path through said passage,
   whereby the latent heat of vaporization of said refrigerant effects cooling of said valve plate.

12. A method of cooling the mechanical compressor in a mechanical refrigeration system of the type wherein the refrigerant alternately vaporizes and condenses, comprising:
   a. drawing refrigerant in substantially one hundred percent liquid condition from said refrigeration system,
   b. passing said liquid refrigerant through an expansion orifice,
   c. conducting liquid directly from the downstream side of said orifice to the mechanical compressor of said system,
   d. passing along at least one elongated path through said compressor, and in effective heat-exchange relationship with the compression chamber of said compressor, the liquid refrigerant which was conducted to said compressor in accordance with step (c),
   said path being along an elongated passage the diameter of which is less than one-fourth the diameter of said compression chamber,
   e. effecting progressive vaporization of said refrigerant thus passed along said path,
   thereby effecting cooling of said compression chamber by heat exchange, and
   f. conducting refrigerant vapor from said path to said compression chamber and injecting such vapor into said compression chamber,
   whereby the vapor thus injected is compressed in said compression chamber along with the vapor in the primary refrigeration circuit of said system.

13. A cooled mechanical compressor for use in a mechanical refrigeration system, which comprises:
   a. wall means to define a compression chamber,
   b. power-driven movable means disposed in said compression chamber to compress vaporous refrigerant therein,
   c. elongated passage means provided in said wall means in effective heat-exchange relationship with said compression chamber,
   said passage means having a diameter less than one-fourth that of said compression chamber, d. orifice means adapted to receive liquid refrigerant, and e. means to pass liquid refrigerant from the downstream side of said orifice means to said passage means for flow therethrough, said liquid refrigerant progressively vaporizing as it flows along said passage means whereby the latent heat of vaporization of said refrigerant is employed to cool said compression chamber.

14. The invention as claimed in claim 13, in which the diameter of said passage means is less than one-sixth the diameter of said compression chamber.

15. The invention as claimed in claim 13, in which said compressor is rotary, and in which said passage means is tortuous.

16. The invention as claimed in claim 15, in which said tortuous passage means is not only in effective heat-exchange relationship with said compression chamber but also with the outlet from said compression chamber.

17. The invention as claimed in claim 15, in which said compressor is a piston-type, and in which said passage means is tortuous.

18. The invention as claimed in claim 17, in which said tortuous passage means is not only in effective heat-exchange relationship with said compression chamber but also with the valve plate of said compressor.

19. The invention as claimed in claim 18, in which said passage means passes through said valve plate.

20. The invention as claimed in claim 13, in which control means are provided to control the flow of refrigerant through said passage means in such manner as to maintain liquid in at least major portions of said passage means, and also in such manner as to prevent cooling of the compressor to the point where the oil therein becomes excessively viscous.

21. The invention as claimed in claim 20, in which said control means comprises a pressure-responsive valve responsive to the pressure in said passage means.

22. The invention as claimed in claim 20, in which said passage means connects at the outlet end thereof to said compression chamber, and in which said pressure-responsive valve includes a pressure-actuated member and means operated by said pressure-actuated member to block flow of refrigerant through said passage means when the vapor pressure therein is less than a predetermined value.

23. The invention as claimed in claim 20, in which said orifice means is in a flow valve, and in which means are provided to control the setting of said valve in response to the temperature of a predetermined part of said passage means.

24. The invention as claimed in claim 20, in which said control means comprises a pressure-responsive valve responsive to the pressure in said passage means, in which said orifice means is in a flow valve, and in which said control means further comprises means to control the setting of said valve in response to the temperature of a predetermined part of said passage means.

25. A refrigeration system of the type wherein a refrigerant is alternately vaporized and condensed, which comprises:

a. a mechanical compressor, b. elongated conduit means in effective heat-transfer relationship with at least the compression chamber of said compressor, said conduit means having a diameter less than one-fourth that of said compression chamber, c. a primary refrigeration circuit, said primary refrigeration circuit comprising condenser means, an expansion orifice and an evaporator in series-relationship to each other, d. means to pass compressed refrigerant from the outlet of said compression chamber to said condenser means, and to pass vaporized refrigerant from said evaporator to the inlet of said compression chamber, e. a secondary refrigeration circuit in partial parallelism with said first circuit, said secondary refrigeration circuit comprising a second expansion orifice and said conduit means in series-relationship to each other, and f. means to pass liquid refrigerant from said condenser means to said second expansion orifice, and to pass vaporous refrigerant from said conduit means to said condenser means, whereby said last-mentioned liquid refrigerant passes through said conduit means and progressively vaporizes therein to thus effectively cool said compression chamber.

26. The invention as claimed in claim 25, in which said elongated conduit means is tortuous, and is provided through the wall of said compression chamber in highly effective heat-exchange relationship with the interior of said compression chamber.

27. The invention as claimed in claim 25, in which said means to pass vaporous refrigerant from said conduit means to said condenser means comprises said compression chamber, whereby vapor from said conduit means is injected into said compression chamber and compressed therein together with the vapor introduced into said chamber from said evaporator.

28. The invention as claimed in claim 23, in which control means are provided in said secondary refrigeration circuit to maintain the desired amount of liquid refrigerant in said conduit means, and to prevent cooling of said compressor to the extent that the oil thereof becomes excessively viscous, said control means being directly responsive to the conditions in said compressor.

29. The invention as claimed in claim 25, in which said means to pass vaporous refrigerant from said conduit means to said condenser means comprises said compression chamber, and in which control means are provided to prevent excessive flow of refrigerant through said secondary refrigeration circuit, said control means including valve means responsive to the pressure in said conduit means to control the injection of refrigerant from said conduit means into said compression chamber.

30. The invention as claimed in claim 25, in which said mechanical compressor is a rotary vane compressor, in which said conduit means extend through the wall of the compression chamber of said compressor in effective heat-exchange relationship with said compression chamber, and also in effective heat-exchange relationship with the outlet region of said compressor, and in which said means to pass vaporous refrigerant from said conduit means to said condenser means, as recited in clause (f), comprises said compression chamber whereby the refrigerant in said secondary refrigerant circuit is compressed in said compression chamber along with the refrigerant in said primary refrigeration circuit.

31. The invention as claimed in claim 25, in which said mechanical compressor is a piston-type compressor, and in which said elongated conduit means is in effective heat-exchange relationship not only with the compression chamber of said compressor but also with outlet regions thereof.

32. The invention as claimed in claim 31, in which said elongated conduit means extends in tortuous relationship through the wall of said compression chamber of said piston-type compressor, and also extends through the valve plate of said piston-type compressor.

* * * * *

UNITED STATES PATENT AND TRADEMARK OFFICE
CERTIFICATE OF CORRECTION

PATENT NO. : 4,006,602
DATED : February 8, 1977
INVENTOR(S) : Ralph Z. Fanberg

It is certified that error appears in the above-identified patent and that said Letters Patent are hereby corrected as shown below:

Column 4, line 14, after "positions" and before "by" insert --- permitted ---.

Column 12, line 63, cancel "abovedescribed" and substitute --- above described ---.

Column 22, line 37 (line 1 of claim 28) cancel "23" and substitute --- 25 ---.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*